(12) United States Patent
Zeng et al.

(10) Patent No.: US 7,744,055 B2
(45) Date of Patent: Jun. 29, 2010

(54) ELECTRONIC DEVICE WITH MULTI-ANGLE POSITIONING SUPPORT

(75) Inventors: Yong-Qing Zeng, Shenzhen (CN); Gao-Hui Tang, Shenzhen (CN); Chiang-Kuo Tang, Taipei Hsien (TW); Jun Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/421,655

(22) Filed: Apr. 10, 2009

(65) Prior Publication Data
US 2010/0012809 A1 Jan. 21, 2010

(30) Foreign Application Priority Data
Jul. 16, 2008 (CN) .................. 2008 1 0302757

(51) Int. Cl.
*A47B 97/04* (2006.01)
(52) U.S. Cl. .................. 248/447; 40/747; 248/454

(58) Field of Classification Search .................. 248/351, 248/447, 454, 455, 456, 457, 458; 40/745, 40/741
See application file for complete search history.

(56) References Cited
U.S. PATENT DOCUMENTS

| | | | | |
|---|---|---|---|---|
| 5,329,712 A | * | 7/1994 | Keller | 40/747 |
| 5,933,996 A | * | 8/1999 | Chang | 40/748 |
| 6,971,622 B2 | * | 12/2005 | Ziegler et al. | 248/454 |
| 7,301,759 B2 | * | 11/2007 | Hsiung | 361/679.27 |
| 2007/0062089 A1 | * | 3/2007 | Homer et al. | 40/754 |
| 2007/0089344 A1 | * | 4/2007 | Ting | 40/754 |

* cited by examiner

*Primary Examiner*—Ramon O Ramirez
(74) *Attorney, Agent, or Firm*—Zhigang Ma

(57) ABSTRACT

An electronic device comprises a back cover and a support. The back cover defines a first contact area. The support is pivoted to the back cover by a pivot shaft, defines a second contact area contacting the first contact area. A plurality of positioning holes are defined in and disposed on the second contact area around the pivot shaft. The electronic device further comprises at least one retractable spring balls projected from the first contact area of the back cover. The spring balls are configured for cooperating with the positioning holes of the support. The support can stay at a variety of positions.

14 Claims, 5 Drawing Sheets

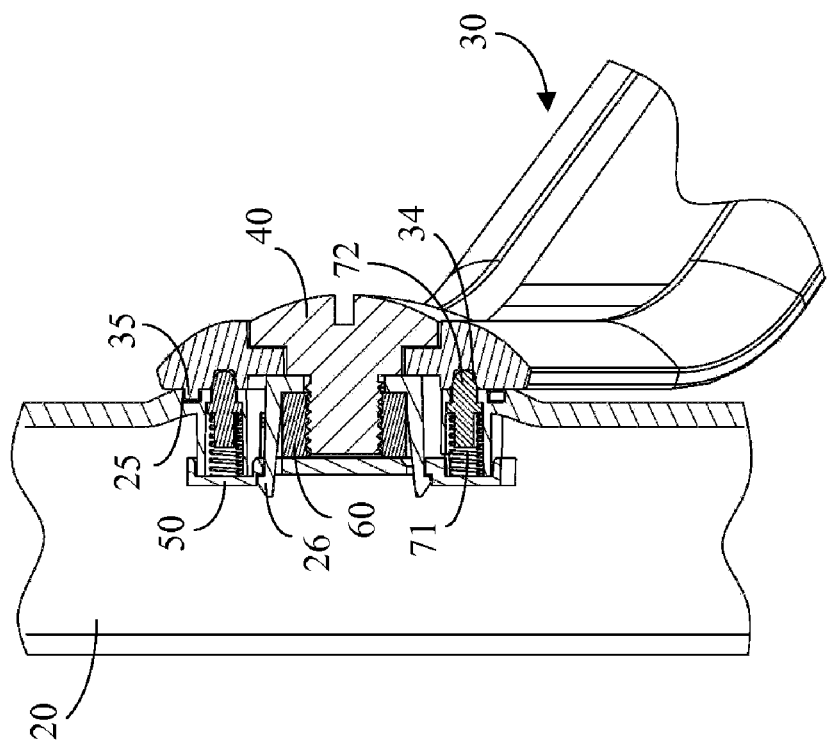

ELECTRONIC DEVICE WITH MULTI-ANGLE POSITIONING SUPPORT

BACKGROUND

1. Technical Field

The present disclosure relates to an electronic device with a support.

2. Description of Related Art

Electronic devices, for example, digital photo frames, usually have supports. One kind of support is one that is non-rotatably fixed to an electronic device. Another kind of the support is one that is rotatably fixed on the electronic device, but has only two positions available.

What is needed is an electronic device with a multi-angle positioning support.

BRIEF DESCRIPTION OF THE DRAWINGS

The elements in the drawings are not necessarily drawn to scale, the emphasis instead being placed upon clearly illustrating the principles of the present disclosure. Moreover, in the drawings, like reference numerals designate corresponding parts throughout the several views.

FIG. 5 is a partial, section view of the electronic device, taken along the line A-A of FIG. 1.

DETAILED DESCRIPTION

Figure 1:
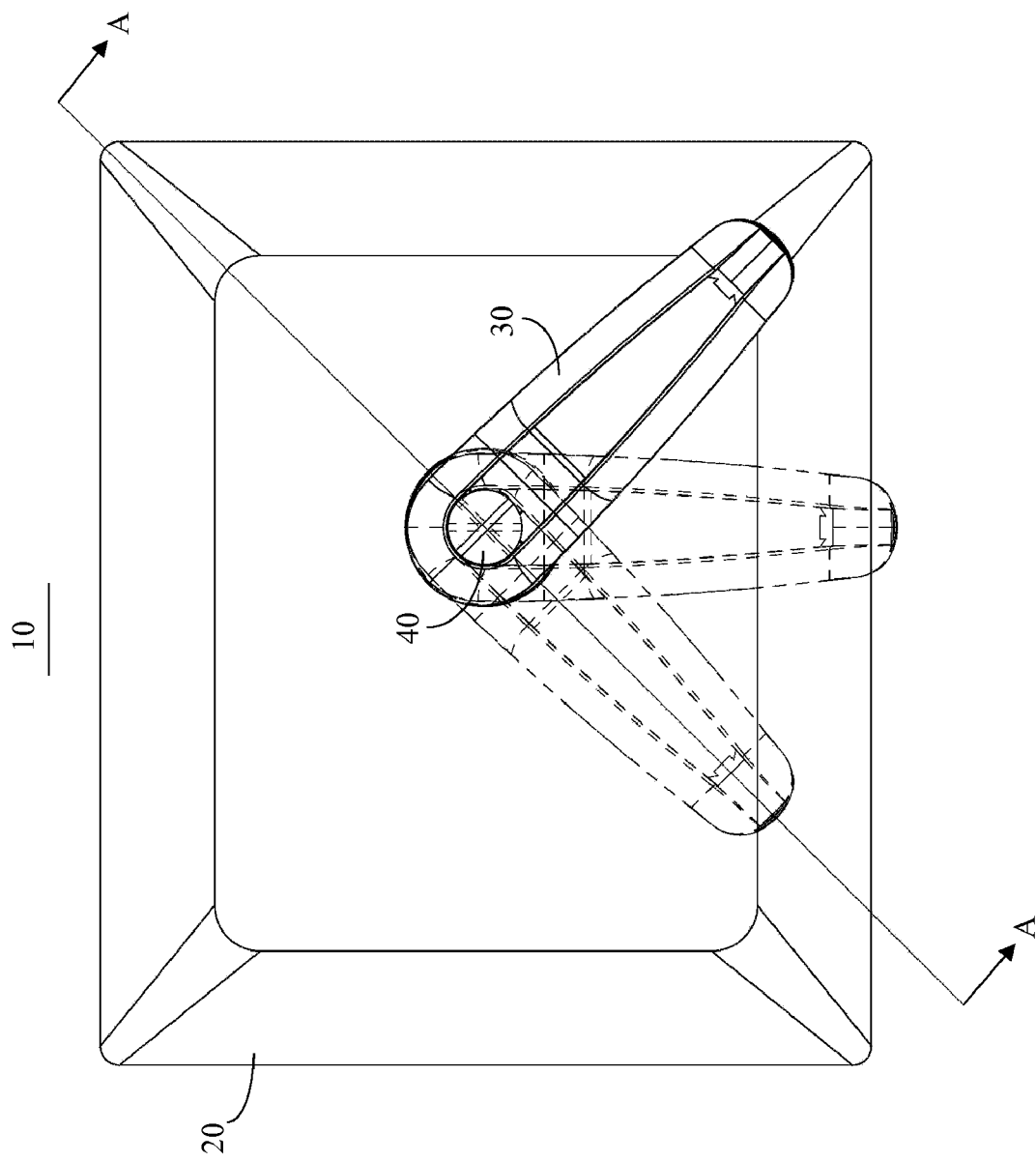
FIG. 1 is a back view of an electronic device according to an exemplary embodiment.
Figure 2:
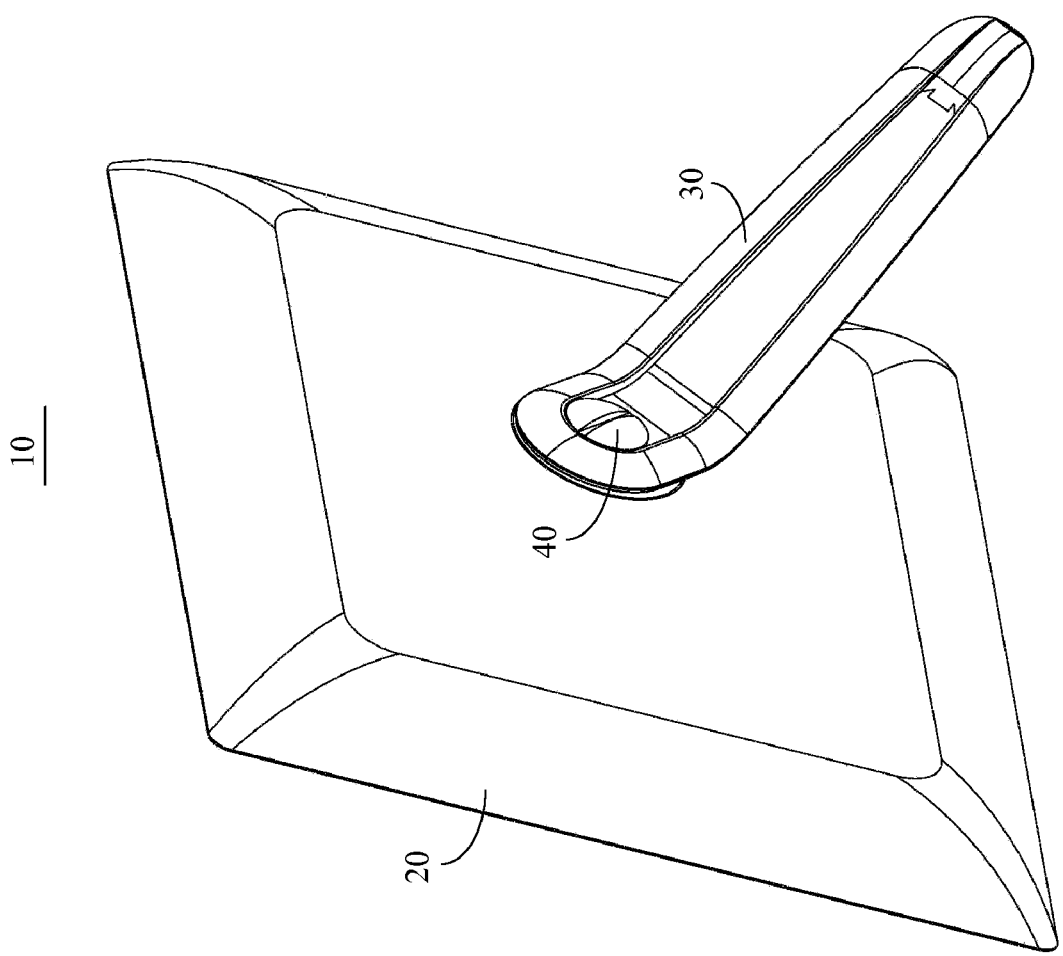
FIG. 2 is a schematic, isometric view of the electronic device of FIG. 1, with a front cover and electronic elements removed.

Referring to FIGS. 1 and 2, an electronic device 10 according to an exemplary embodiment is disclosed. The electronic device 10 includes a back cover 20 and a support 30. The support 30 is pivoted to the back cover 20 by a pivot shaft 40. In this embodiment, the pivot shaft 40 is a screw.

Figure 4:
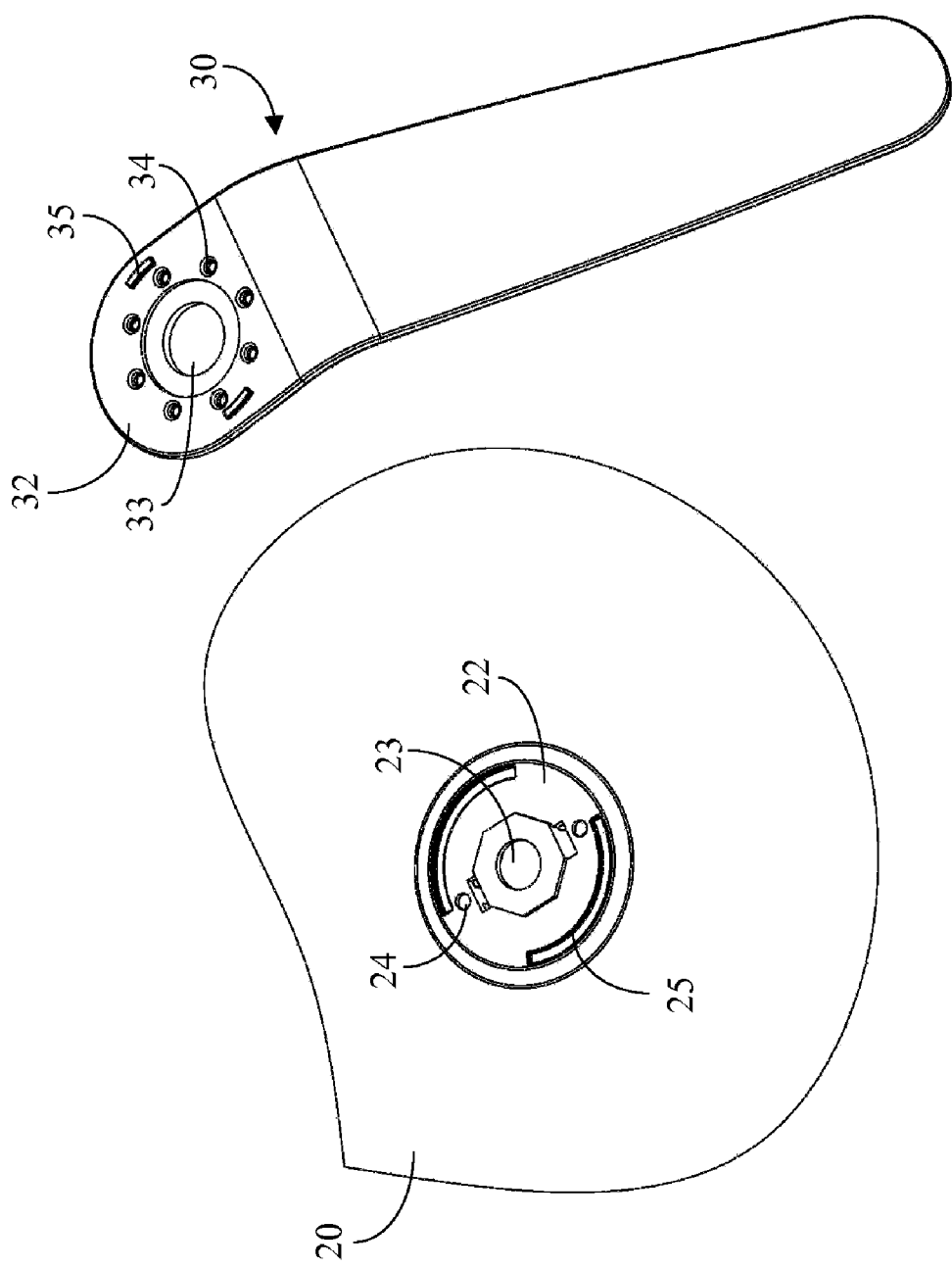
FIG. 4 is an enlarged view, showing a support and a part of a back cover of the electronic device of FIG. 1.

Referring to FIG. 4, the support 30 is an elongated plate bent at one end thereof. The bent end forms a contact area 32. A through hole 33 is defined in the contact area 32. A plurality of positioning holes 34 and two protrusions 35 are disposed around the through hole 33.

The back cover 20 defines a contact area 22 on an outer surface thereof. The contact area 22 contacts the contact area 32 of the support 30 when assembled. A through hole 23 is defined in the contact area 22. Two step through holes 24 corresponding to the positioning holes 34 and two arc-shaped limiting grooves 25 corresponding to the protrusions 35 are defined in and disposed around the through hole 23. Referring to FIG. 5, the back cover 20 further includes two hooks 26 projected from an inner surface thereof.

Figure 3:
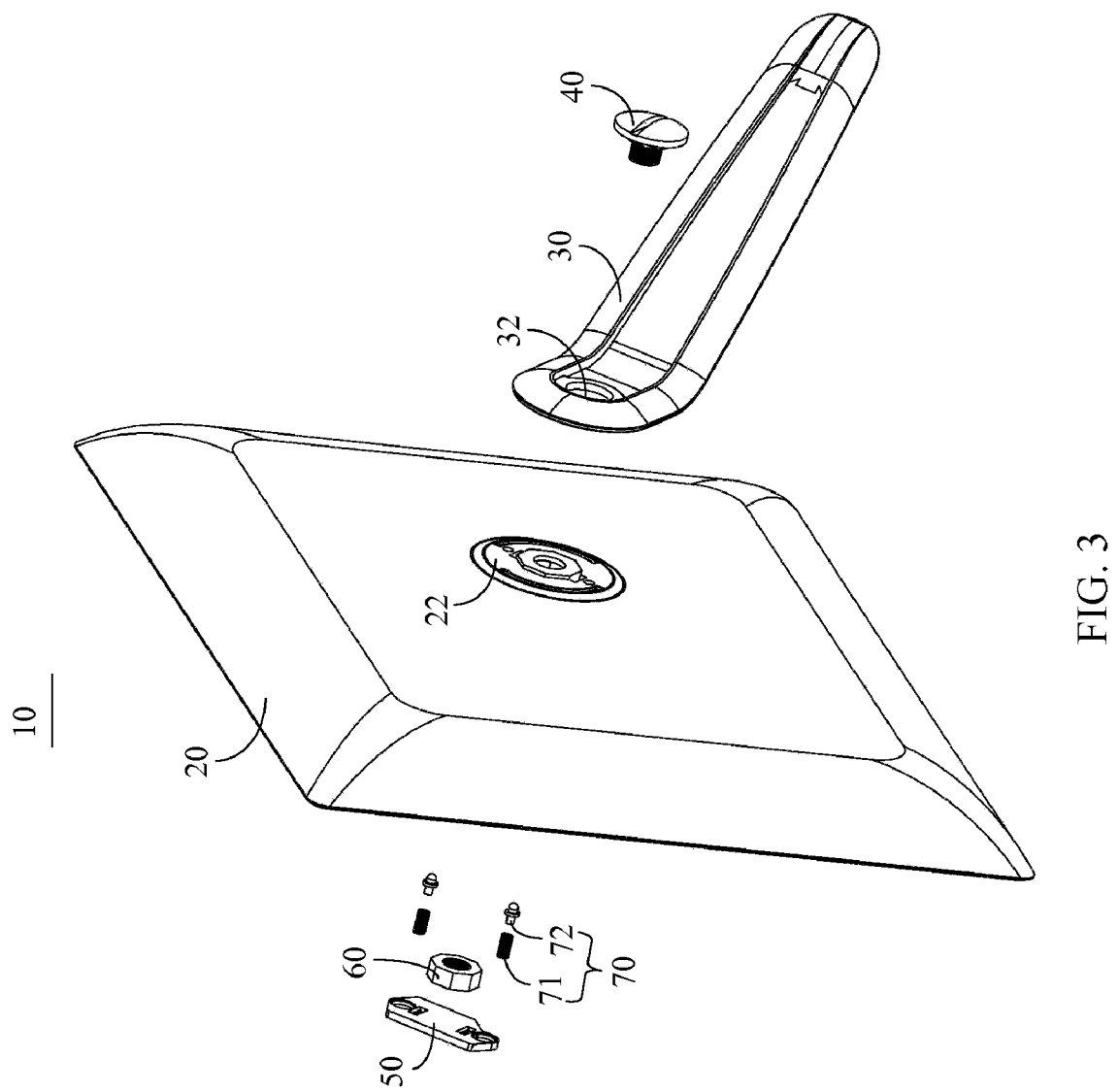
FIG. 3 is an exploded view of the electronic device of FIG. 2.

Referring to FIG. 3, the electronic device 10 further includes two retractable spring balls 70, a nut 60, and an overlay 50. Each spring ball 70 includes a spring 71 and a rod 72. Referring to FIG. 5, the rod 72 is round head and includes a flange extended on a middle portion thereof.

Referring to FIGS. 3, 4, and 5 at the same time, to assemble the electronic device 10, first, let the screw 40 extend through the holes 33, 23 and engage with the nut 60, thus to connect the support 30 to the back cover 20, and let the arc-shaped grooves 25 of the back cover 20 receive the protrusions 35 of the support 30. Second, let the rods 72 of the spring balls 70 extend through the step holes 24 of the back cover 20, the flanges of the rods 72 resist against the steps of the step holes 24, and the round heads of the rods 72 enter into the positioning holes 34 of the support 30, and let the springs 71 of the spring balls 70 resiliently support the rods 72. Finally, let the overlay 50 receive the springs 71, and the hooks 26 of the back cover 20 engage the overlay 50.

Referring to FIGS. 1, 4, and 5, if the support 30 receives a rotary force, the support 30 pushes the rods 72 to slide out of the positioning holes 34, and the springs 71 are compressed at this time, thereby the support 30 rotates around the screw 40. Once the rotary force is withdrawn, the springs 71 rebound and push the rods 72 to slide into the positioning holes 34, thus to prevent the support 30 from continued rotation. As the support 30 has a plurality of positioning holes 34, the support 30 can stay at various positions.

When the support 30 rotates around the screw 40, the protrusions 35 of the support 30 slide in the arc-shaped grooves 25 of the back cover 20, thus, a sector angle of the arc-shaped grooves 25 determines a rotation range of the support 30.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An electronic device comprising:

a back cover defining a first contact area;

a support pivoted to the back cover by a pivot shaft, wherein the support defines a second contact area contacting the first contact area, and a plurality of positioning holes are defined in and disposed on the second contact area around the pivot shaft; and at least one retractable spring ball projected from the first contact area of the back cover, configured for cooperating with the positioning holes of the support;

wherein when the support rotates, the at least one retractable spring ball slides out of a corresponding one of the positioning holes, and when the support is at rest, the at least one retractable spring ball slides into a corresponding one of the positioning holes to maintain position of the support.

2. The electronic device of claim 1, further comprising protrusions projected from the second contact area, and arc-shaped grooves defined in the first contact area for receiving the protrusions.

3. The electronic device of claim 2, wherein the pivot shaft is a screw.

4. The electronic device of claim 3, further comprising a nut engaging with the pivot shaft.

5. The electronic device of claim 2, further comprising an overlay for fixing the spring balls on the back cover.

6. The electronic device of claim 5, wherein the back cover comprises hooks for fixing the overlay.

7. The electronic device of claim 2, wherein the support is an elongated plate bent at one end.

8. The electronic device of claim 2, wherein the at least one retractable spring ball comprises two retractable spring balls.

9. The electronic device of claim 1, wherein the pivot shaft is a screw.

10. The electronic device of claim 9, further comprising a nut engaging with the pivot shaft.

11. The electronic device of claim 1, further comprising an overlay for fixing the spring balls on the back cover.

12. The electronic device of claim 11, wherein the back cover comprises hooks for fixing the overlay.

13. The electronic device of claim 1, wherein the support is an elongated plate bent at one end.

14. The electronic device of claim 1, wherein the at least one retractable spring ball comprises two retractable spring balls.

* * * * *